US008873859B2

(12) United States Patent
Yashiro (10) Patent No.: US 8,873,859 B2
(45) Date of Patent: Oct. 28, 2014

(54) APPARATUS AND METHOD THAT DETERMINES WHETHER A PATTERN WITHIN THE DETECTION WINDOW IS A SUBJECT BASED ON CHARACTERISTIC AMOUNTS OBTAINED FROM WITHIN A FIRST REGION

(75) Inventor: Satoshi Yashiro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 12/874,046

(22) Filed: Sep. 1, 2010

(65) Prior Publication Data
US 2011/0052076 A1 Mar. 3, 2011

(30) Foreign Application Priority Data

Sep. 2, 2009 (JP) ................................. 2009-202856

(51) Int. Cl.
*G06K 9/46* (2006.01)
*G06K 9/00* (2006.01)
*G06K 9/62* (2006.01)

(52) U.S. Cl.
CPC .......... *G06K 9/00362* (2013.01); *G06K 9/6202* (2013.01); *G06K 9/6288* (2013.01)
USPC .......................................... 382/190; 382/181

(58) Field of Classification Search
None
See application file for complete search history.

(56) References Cited

U.S. PATENT DOCUMENTS

| 5,703,368 | A  | * | 12/1997 | Tomooka et al. | ............. | 250/349 |
| 2005/0232491 | A1 | * | 10/2005 | Chang et al. | .................. | 382/199 |
| 2007/0036429 | A1 |  | 2/2007 | Terakawa | | |
| 2007/0237387 | A1 |  | 10/2007 | Avidan | | |
| 2009/0002517 | A1 | * | 1/2009 | Yokomitsu et al. | ........ | 348/223.1 |
| 2009/0080711 | A1 | * | 3/2009 | Yokoi | ........................... | 382/116 |

FOREIGN PATENT DOCUMENTS

| JP | 2006-259847 A | 9/2006 |
| JP | 2007-042072 A | 2/2007 |
| JP | 2007-47965 | 2/2007 |
| JP | 2007-310805 A | 11/2007 |
| JP | 2009-075868 A | 4/2009 |

* cited by examiner

*Primary Examiner* — Jason M Repko
*Assistant Examiner* — Jhere Rowland
(74) *Attorney, Agent, or Firm* — Canon USA Inc IP Division

(57) ABSTRACT

An image processing apparatus includes an image input unit configured to input an image, a scanning unit configured to scan a detection window on the input image, a first discrimination unit configured to determine whether a pattern within the detection window is a subject based on a plurality of characteristic amounts obtained from within a first region among a plurality of regions within the detection window, and a second discrimination unit configured to determine, if it is determined that the pattern is not the subject by the first discrimination unit, whether the pattern is the subject based on a plurality of characteristic amounts obtained from a second region in which a probability that occlusion of the subject occurs is higher than that in the first region among the plurality of regions. Accordingly, a subject can be detected efficiently, and omissions of detection can be reduced.

8 Claims, 10 Drawing Sheets

302 DETECTION WINDOW
301 SUBJECT

303 UPPER BODY REGION

APPARATUS AND METHOD THAT DETERMINES WHETHER A PATTERN WITHIN THE DETECTION WINDOW IS A SUBJECT BASED ON CHARACTERISTIC AMOUNTS OBTAINED FROM WITHIN A FIRST REGION

BACKGROUND OF THE INVENTION

1. Field of the Invention

The present invention relates to an image processing apparatus, a subject discrimination method, a program and a storage medium.

2. Description of the Related Art

A technique is known for enabling detection even when a portion of a detection target is shielded, as discussed in Japanese Patent Application Laid-Open No. 2007-47965. In this technique, a plurality of discriminators are generated by causing a plurality of discriminators to learn by using a detection target in which portions different from one another are occluded by dislocating a pattern clipping position, for example. Further, in this technique, detection is enabled when either one portion of the detection target is shielded by applying the plurality of discriminators on a parallel arrangement.

Now, consider a case in which, for example, a surveillance camera is installed on a ceiling of corridor, a video image of pedestrians passing through the corridor is captured from obliquely above, and a person is detected from the captured video image. In the video image obtained from the surveillance camera, a probability that a body part is hidden due to overlaps of people becomes higher in lower body regions than heads of the pedestrians with increasing crowding level. Further, a person who comes in a frame of the camera from immediately below the camera usually comes in the frame from the head. As a result, an occurrence probability of occlusion tends to become higher in a lower part in an entire body of a pedestrian.

The conventional technique described above needs to perform discrimination by a plurality of discriminators corresponding to different hidden areas from one another with respect to one pattern. For this reason, a processing cost is high, and subjects cannot be detected more efficiently. Further, in the conventional technique described above, a case where occurrence probability of the occlusions is varied depending on locations of the subjects is not considered.

SUMMARY OF THE INVENTION

The present invention is directed to detecting a subject efficiently, and reducing detection omissions.

According to an aspect of the present invention, an image processing apparatus includes an image input unit configured to input an image, a scanning unit configured to scan a detection window on the input image, a first discrimination unit configured to determine whether a pattern within the detection window is a subject based on a plurality of characteristic amounts obtained from within a first region among a plurality of regions within the detection window, and a second discrimination unit configured to determine, if it is determined that the pattern is not the subject by the first discrimination unit, whether the pattern is the subject based on a plurality of characteristic amounts obtained from a second region in which a probability that occlusion of the subject occurs is higher than that in the first region among the plurality of regions.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
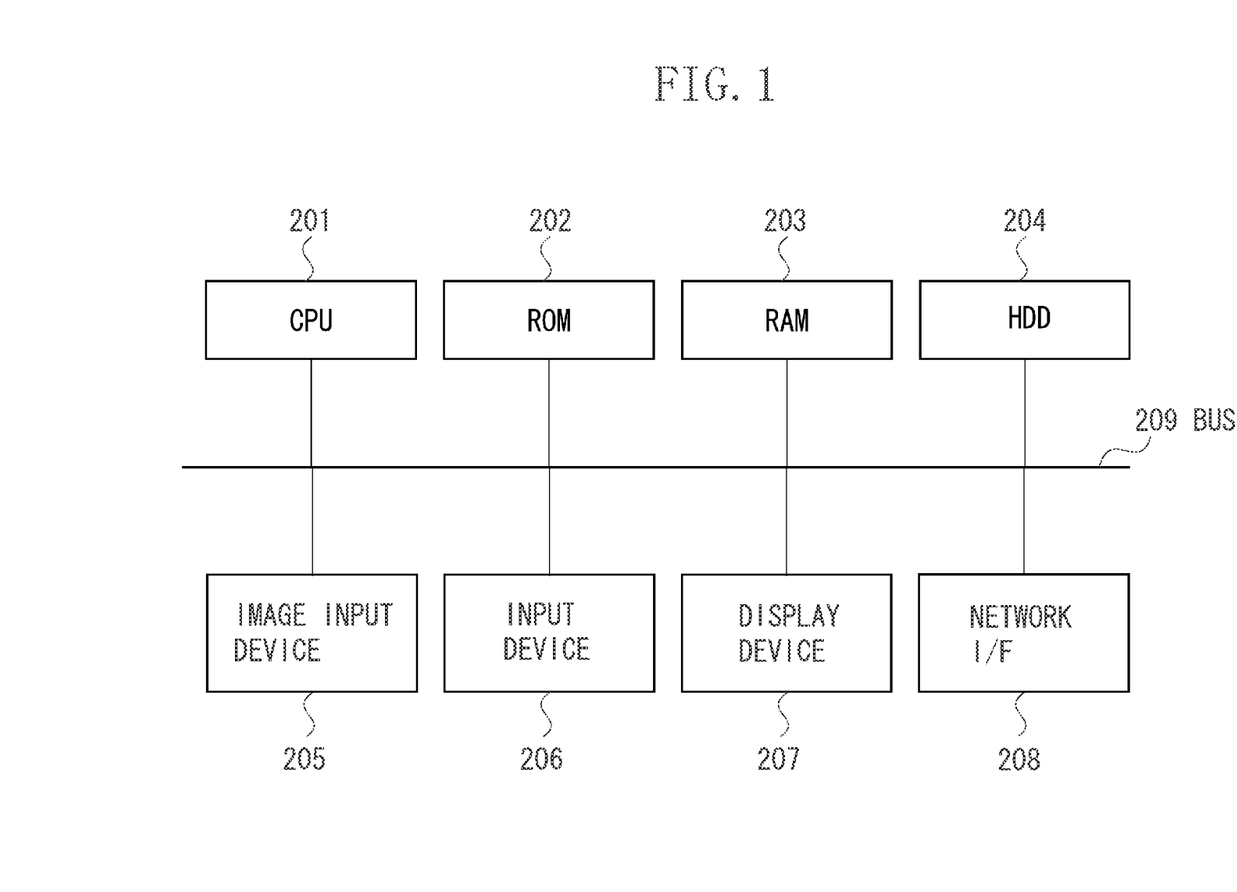
FIG. 1 illustrates an example of a hardware configuration of an image processing apparatus according to a first exemplary embodiment of the present invention.

FIG. 1 illustrates an example of a hardware configuration of an image processing apparatus according to a first exemplary embodiment. A central processing unit (CPU) 201 executes a program stored in a read-only memory (ROM) 202 or a random-access memory (RAM) 203. The ROM 202 is a non-volatile memory, and stores a program which is executed for processing of the present exemplary embodiment as well as other programs and pieces of data necessary for control. The RAM 203 is a volatile memory, and stores temporary data such as frame image data and pattern discrimination results. A hard disk drive (HDD) 204 is a secondary storage device, and stores image information, a subject sample pattern, a non-subject pattern, and the like. These pieces of information are transferred to the RAM 203 by the CPU 201 at the time when a program is executed and utilized. The program executed for the processing of the present exemplary embodiment may be stored in the HDD 204 or the like.

An image input device 205 may include, for example, a digital video camera, a network camera, and a scanner, and inputs an image. An input device 206 may include, for example, a keyboard or a mouse, and is used by an operator to input an instruction. A display device 207 may include, for example, a cathode-ray tube (CRT) display or a liquid crystal display. A network interface (I/F) 208 is a modem or a local area network (LAN) that connects the image processing apparatus and a network such as the Internet, or an intranet. The image input device such as the network camera may be connected to the network via the network I/F 208 to input an image into the image processing apparatus. A bus 209 mutually connects the above described components, and is used for input and output of data. Functions of the image processing apparatus described below are installed as application programs that operate on an operating system (OS).

A part of or all of the functions of the image processing apparatus described below, and processing in each step of flowcharts described below are implemented by the CPU 201 executing the program.

Figure 2:
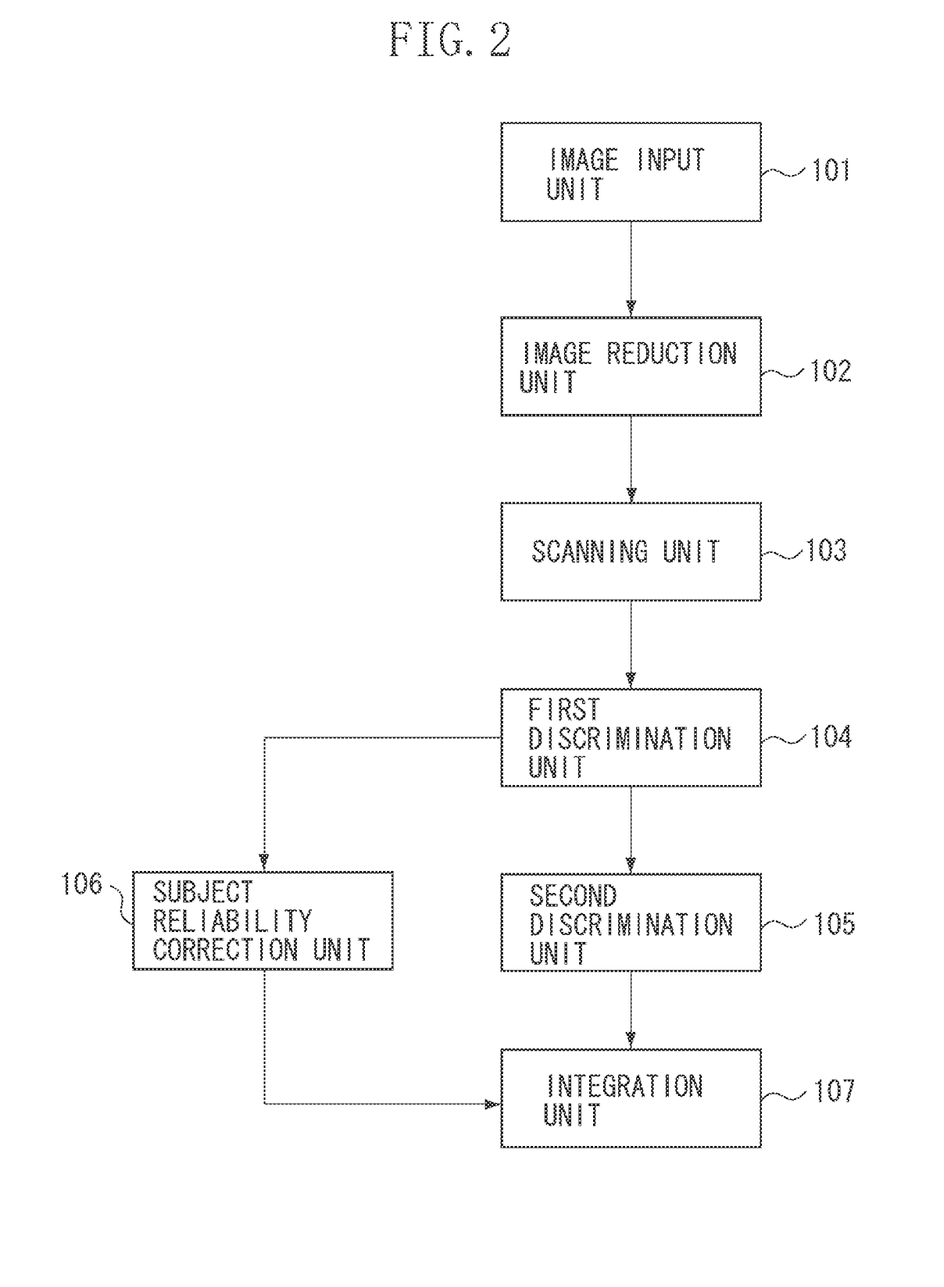
FIG. 2 illustrates an example of a functional configuration of the image processing apparatus.

FIG. 2 illustrates an example of a functional configuration of the image processing apparatus. An image input unit 101 delivers an image input by the image input device 205 to an image reduction unit 102 described below. The image reduction unit 102 reduces the input image in a step-by-step manner, in order to detect subjects of various sizes using a detection window of a predetermined size. A scanning unit 103, as described below referring to the processing in FIG. 5, performs raster scan of the detection window on the reduced image. A first discrimination unit 104 determines whether a pattern within the detection window is a subject. At this time, the first discrimination unit 104 performs the discrimination in a local region limited to a region of an upper body (first region) of a person where occurrence probability of occlusion is low, and outputs subject reliability.

A second discrimination unit 105, similarly to the first discrimination unit 104, determines whether a pattern on the detection window is the subject. At this time, the second discrimination unit 105 performs discrimination in a local region of an entire body region (second region) of the person, where occurrence probability of the occlusion is high, and outputs the subject reliability. A subject reliability correction unit 106 performs correction on the subject reliability output by the first discrimination unit 104. An integration unit 107 determines whether a plurality of detection window positions which are discriminated as subjects indicates the same subject, performs grouping for each subject, and organizes as a position of the subject.

Figure 3:
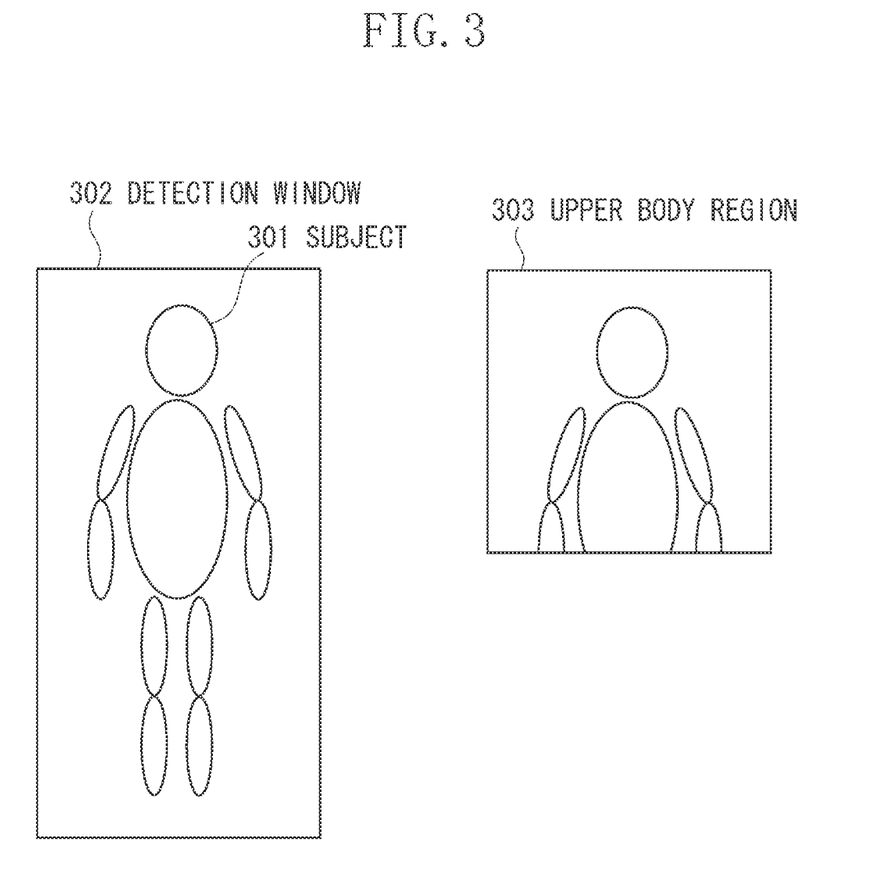
FIG. 3 illustrates an example of a subject as a detection target and a detection window.

FIG. 3 illustrates an example of a subject as a detection target and a detection window. A subject 301 is a person standing upright or walking. A detection window 302 is a rectangle of a predetermined size including the entire body of the subject. An upper body region 303 is an upper half region of the detection window. The upper body region 303 is a region in which probability of occlusion due to overlaps of people or the like becomes lower than other regions, when the person is photographed with a camera installed on a ceiling.

Next, a flow of the processing according to the present exemplary embodiment will be described below with reference to a flowchart in FIG. 4. In the present exemplary embodiment, the image processing apparatus that detects a pedestrian as a subject will be described below.

Figure 4:
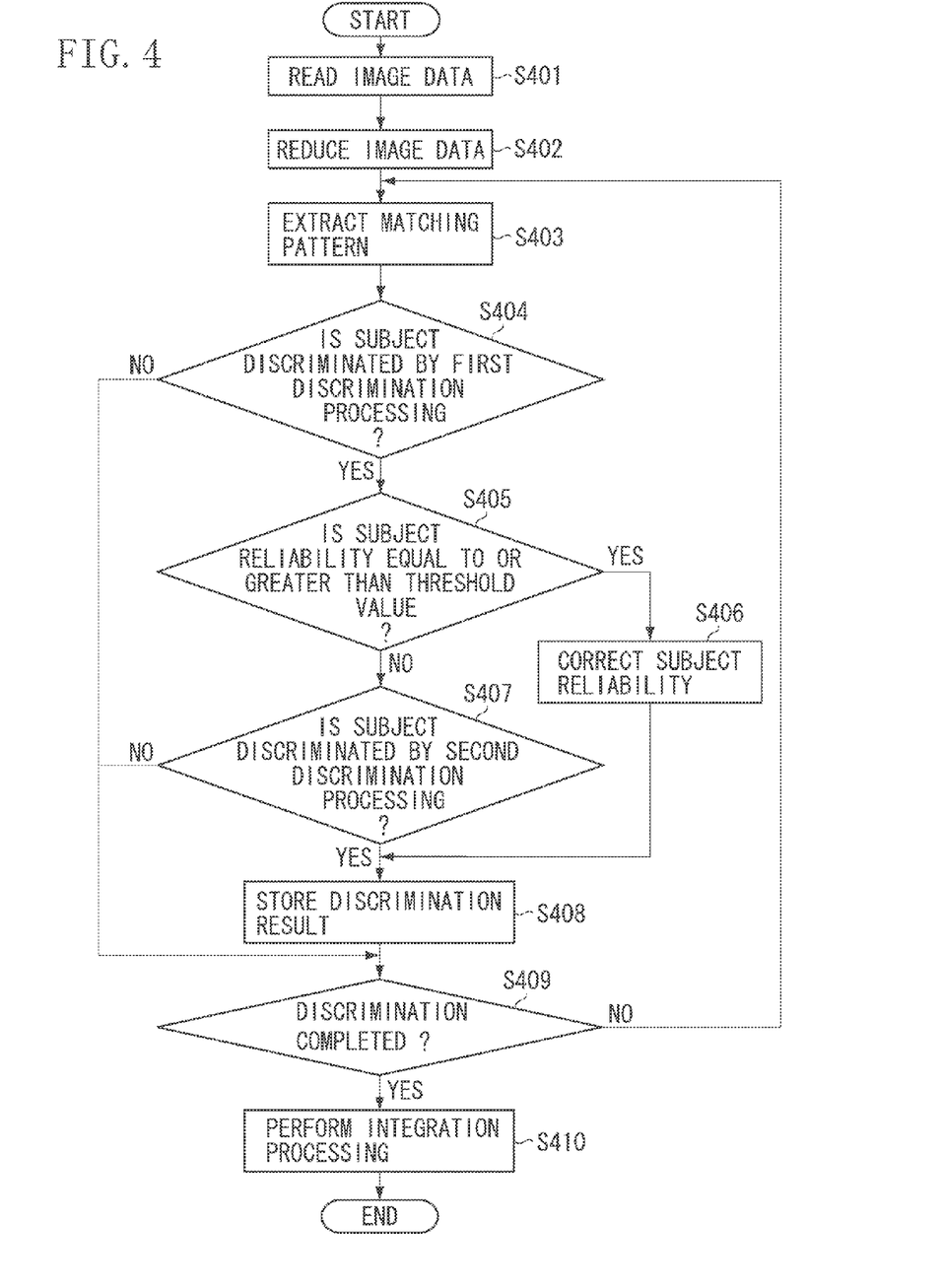
FIG. 4 is a flowchart illustrating an example of subject discrimination processing.

FIG. 4 is the flowchart illustrating an example of subject discrimination processing. First, in step S401, the image input unit 101 reads each piece of frame image data input from the image input device 205 into the RAM 203.

The image data read in this process is data in two-dimensional array formed from pixels of 8 bits, for example, and is configured of three surfaces of red (R), green (G), and blue (B). At this time, if the image data is compressed by a system of a moving picture experts group (MPEG), a motion joint photographic experts group (Motion-JPEG), or the like, the image input unit 101 decompresses the image data according to a predetermined decompression method, to restore them to the image data formed from respective pixels of RGB. Moreover, in the present exemplary embodiment, the image input unit 101 converts the RGB data into luminance data, and stores the luminance image data in the RAM 203 so as to apply the data to subsequent processing.

The present exemplary embodiment is not limited to the RGB data. A distance image that indicates a distance between the camera and the subject in each pixel or a strength image by an infrared sensor may be used. Alternatively, a plurality of pieces of image data may be used which are subjected to one or different types of image processing including normalization such as brightness or contrast adjustments, color conversion processing, and image processing such as blurring or sharpening performed by the image input unit 101. Further, the image data may use YCrCb data, and in this case, the image input unit 101 may use Y-component as it is as luminance data.

Next, in step S402, the image reduction unit 102 reduces sequentially the image data to a predetermined magnification in step-by-step manner. The sequential detection is performed on the image data of a plurality of sizes in order to handle detection of subjects with various sizes in the present exemplary embodiment.

Figure 5:
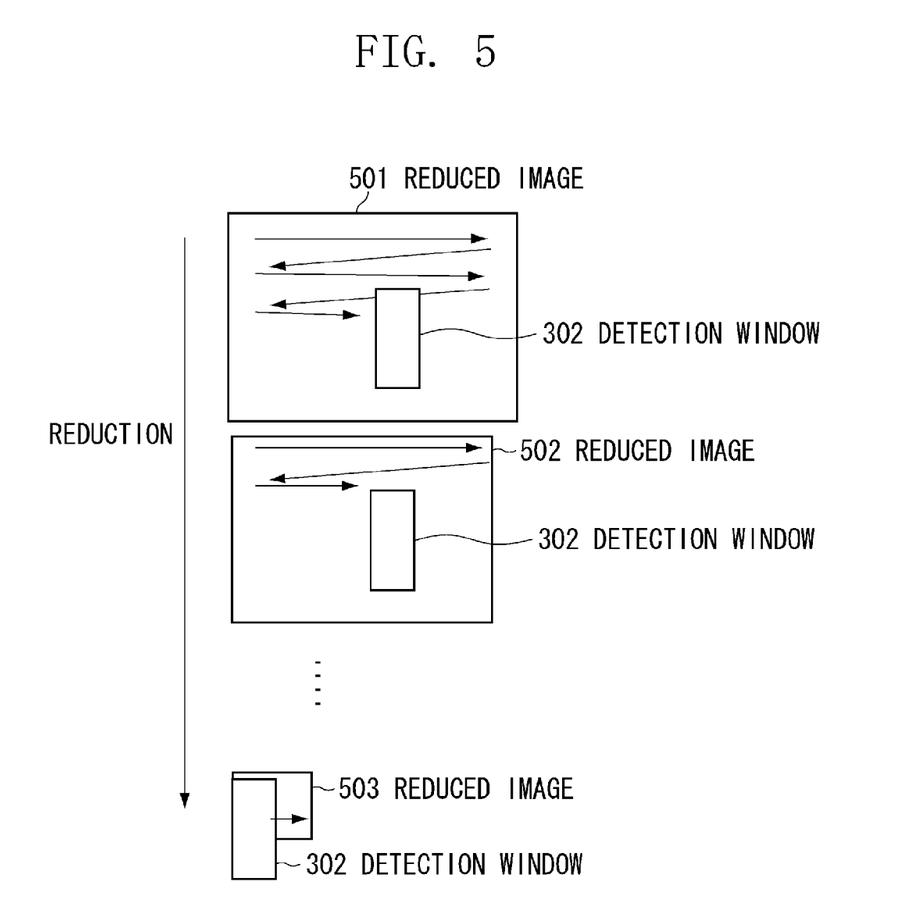
FIG. 5 illustrates an example of reduction and scanning of an image.

FIG. 5 illustrates an example of reduction and scanning of an image. Reduced images 501, 502, and 503 in FIG. 5 are images output by the present processing. In the present exemplary embodiment, the image reduction unit 102 reduces the image data in 1/1.2 times increments, and repeats reduction operations until a width of the reduced image 503 becomes smaller than a width of the upper body region 303, or a height of the reduced image 503 becomes smaller than a height of the upper body region 303.

Next, in step S403, the scanning unit 103 sets the detection window 302 on the reduced luminance image data, and extracts a matching pattern. FIG. 5 illustrates a manner in which the scanning unit 103 scans the detection window 302. In the present exemplary embodiment, the scanning unit 103 performs raster scan at every 4 pixels in height and width.

Next, in step S404, the first discrimination unit 104 performs first discrimination processing of the matching pattern. In this process, the first discrimination unit 104 determines whether the pattern is the subject using only a local region within the upper body region where the occlusion probability is low. If the first discrimination unit 104 determines that the matching pattern is not the subject (NO in step S404), then the process proceeds to step S409. If the first discrimination unit 104 determines that the matching pattern is the subject (YES in step S404), then the first discrimination unit 104 outputs subject reliability as a result of the discrimination, and the process proceeds to step S405.

In step S405, the first discrimination unit 104 determines whether the subject reliability is equal to or greater than a predetermined threshold value. If the subject reliability is equal to or greater than the predetermined threshold value (YES in step S405), then the process proceeds to step S406. In step S406, the subject reliability correction unit 106 corrects the subject reliability. Basically, it is desirable to determine the subject reliability after performing second discrimination processing. In this process, however, the matching pattern is determined as the subject in the first discrimination processing, and the second discrimination processing is omitted for speeding up the processing. The processing in step S405 is for minimizing an error that may occur in the subject reliability.

The subject reliability correction unit 106 obtains in advance an approximate equation using the following equation (1) from a statistical relationship between subject reliability of the upper body and subject reliability of the entire body in a subject image where no occlusions exist.

$$f(x) = \alpha x + \beta \qquad (1)$$

x is a subject reliability of an upper body output by the first discrimination unit 104. α and β are approximate parameters. Further, β may take sufficiently large value so that subject reliability of the upper body always exceeds a maximum value of subject reliability of the entire body.

On the other hand, if the subject reliability is not equal to or greater than a predetermined threshold value (NO in step S405), the process proceeds to step 407. In step S407, the second discrimination unit 105 performs second discrimination processing of the matching pattern. Difference between the first discrimination processing and the second discrimination processing is to use a local region of the whole detection window (within the second region) including a region where the occlusion probability is high.

If the second discrimination unit 105 determines that the matching pattern is not the subject (NO in step S407), then the process proceeds to step S409. On the other hand, if the second discrimination unit 105 determines that the matching pattern is the subject (YES in step S407), then the second discrimination unit 105 outputs the subject reliability as a result of discrimination, and the process proceeds to step S408. The second discrimination unit 105 outputs the subject reliability which is obtained by accumulating output of each weak discriminator of the second discrimination unit 105 in the result of the first discrimination processing.

In step S408, the integration unit 107, for example, stores the subject reliability and a position of the detection window in association with each other in the RAM 203.

Next, in step S409, the integration unit 107, for example, determines whether the detection windows have been scanned in all of the reduced images and positions. If scanning in all reduced images and positions is completed (YES in step S409), then the process proceeds to step S410. Whereas, if not (NO in step S409), the process proceeds to step S403, and the processing is repeated.

In step S410, the integration unit 107 performs integration processing. The integration unit 107 combines the detection windows which indicate the same subject into one window, as the integration processing, with respect to positions of a plurality of detection windows that have been determined as the subject which are stored in step S408. In other words, the integration unit 107 determines whether the plurality of the detection window positions that have been determined as the subjects indicate the same subject, and performs grouping of positions for each subject to organize as positions of the subjects.

In order to determinate whether two arbitrary detection window positions indicate the same subject, the integration unit 107 calculates an average distance between coordinates of upper apexes of the detection windows, and determines as the same subject if a ratio of the average distance to a width of the detection window is equal to or smaller than a threshold value. The integration unit 107 performs this processing on all combinations of the detection window positions that have been determined as the subjects, and groups the detection windows which indicate the same subject together.

Next, the integration unit 107 performs integration of positions and integration of subject reliability for each group, and organizes them as positions of the subjects. The integration unit 107 takes an integration result of positions as coordinate average of each of the grouped detection windows. Further, the integration unit 107 employs a maximum value of the subject reliability of each of the detection windows, as the integration result of the subject reliability.

The integration unit 107 may use a mean shift clustering method for integration processing. To explain more specifically, the integration unit 107, first, regards each of the detection windows determined as the subject as one cluster. Then, the integration unit 107 defines a distance function between clusters. The distance is, for example, an average distance between coordinates of the upper apexes of the detection windows. Next, if a distance between two arbitrary clusters is smaller than a predetermined threshold value, the integration unit 107 performs processing for integrating the positions thereof into one cluster. Then, the integration unit 107 repeats the integration processing until no integration target is left. If all the integration targets are processed, the integration unit 107 increases the threshold value little by little, and repeats to attempt integration processing again. When integration of positions is performed, the integration unit 107 calculates a weighted average based on a number of members of a cluster, if weighting based on the subject reliability is further performed, positions of the subjects can be more accurately identified.

Figure 6:
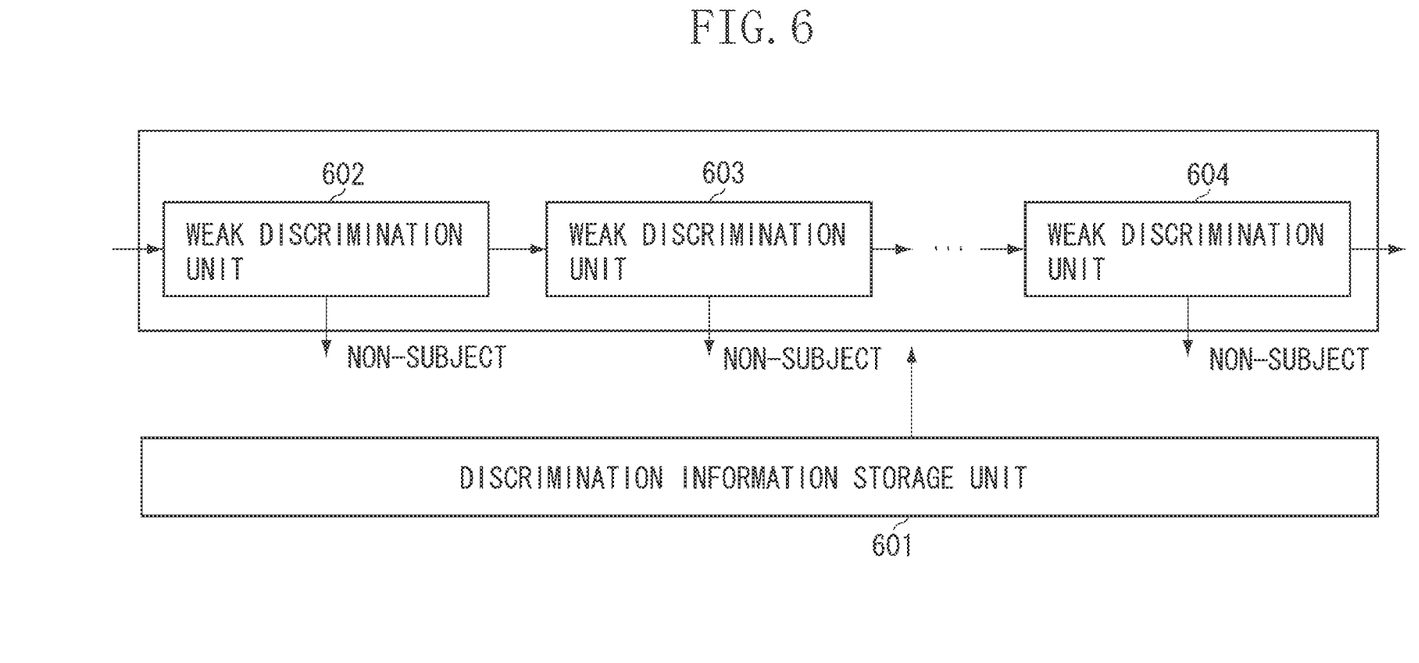
FIG. 6 illustrates an example of a first discrimination unit.

Next, the details of the first discrimination processing will be described below with reference to FIG. 6. FIG. 6 illustrates an example of the first discrimination unit 104.

The first discrimination unit 104 includes a plurality of weak discrimination units 602, 603, and 604. The plurality of weak discrimination units 602, 603, and 604 are connected in series. The first weak discrimination unit 602 determines whether input pattern data is a subject. Only when a discrimination result of the pattern data is the subject, the weak discrimination unit 603 at a subsequent stage determines whether the same pattern data is the subject. If it is determined that the pattern data is the subject by the last weak discrimination unit 604, then a discrimination result of the first discrimination unit 104 will be "pattern data is the subject". Each of the weak discrimination units has similar configuration, and only discrimination information is different from each other. The discrimination information is obtained through machine learning, and is stored in a discrimination information storage unit 601 constituted of the RAM 203 or the like. The second discrimination unit 105 has the same configuration as that of the first discrimination unit 104, and only discrimination information and a number of weak discrimination units are different.

Figure 7:
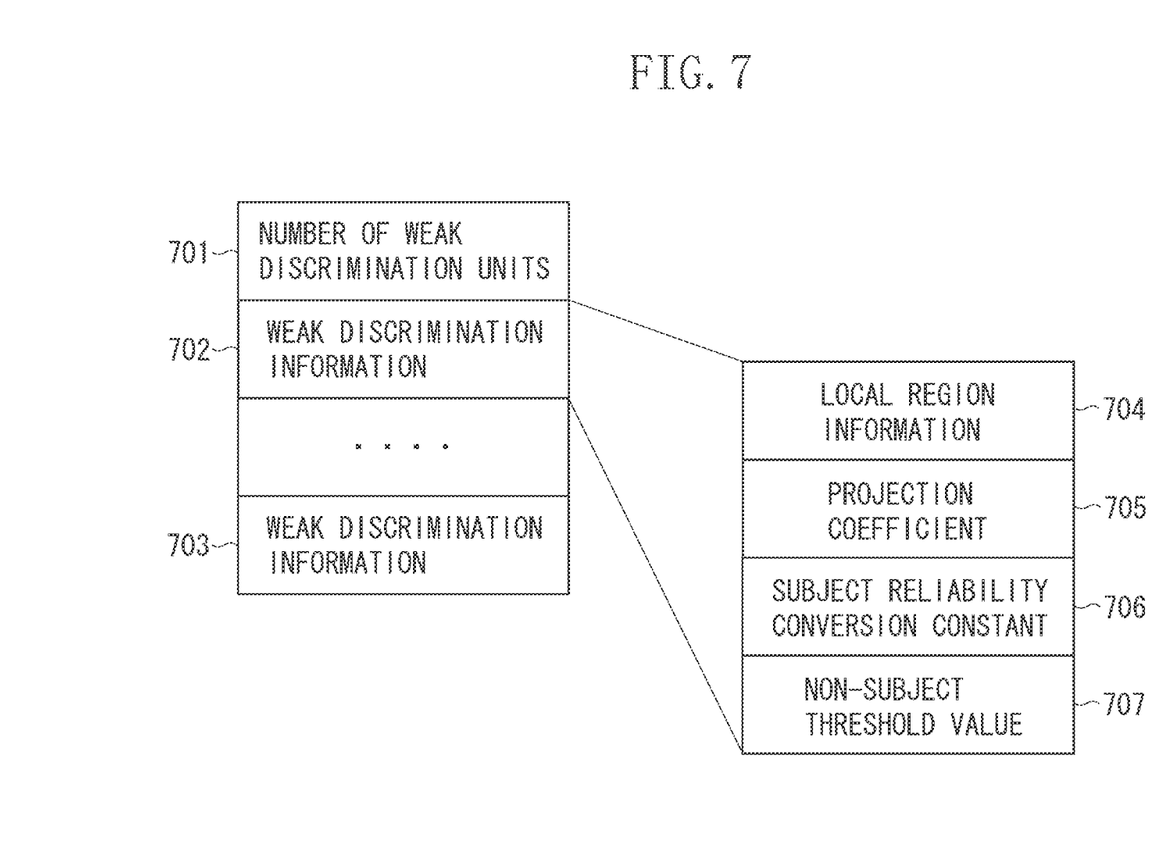
FIG. 7 illustrates an example of a data structure of discrimination information.

Next, the discrimination information stored in the discrimination information storage unit 601 will be described below with reference to FIG. 7. FIG. 7 illustrates an example of a data structure of the discrimination information. A number of units 701 is a number of the weak discrimination units. Weak discrimination information 702 and weak discrimination information 703 are information related to one weak discrimination unit respectively, and pieces of the weak discrimination information with similar structure are aligned for a number of sets stored in the number of units 701. The first weak discrimination information 702 is discrimination information for the weak discrimination unit 602. On the other hand, the last weak discrimination information 703 is discrimination information for the weak discrimination unit 604.

Each piece of information 704 to 707 is detailed information related to one weak discrimination unit. Local region information 704 includes a position and a size of a local region of a rectangle within a detection window. A projection coefficient 705 is a base vector for projecting onto a discrimination space by an inner product with a feature vector. A subject reliability conversion constant 706 indicates a threshold value for quantizing a scalar characteristic amount to two stages, and subject reliability that corresponds to each stage. A non-subject threshold value 707 is a threshold value for the subject reliability to determine whether it is a non-subject or not.

Figure 8:
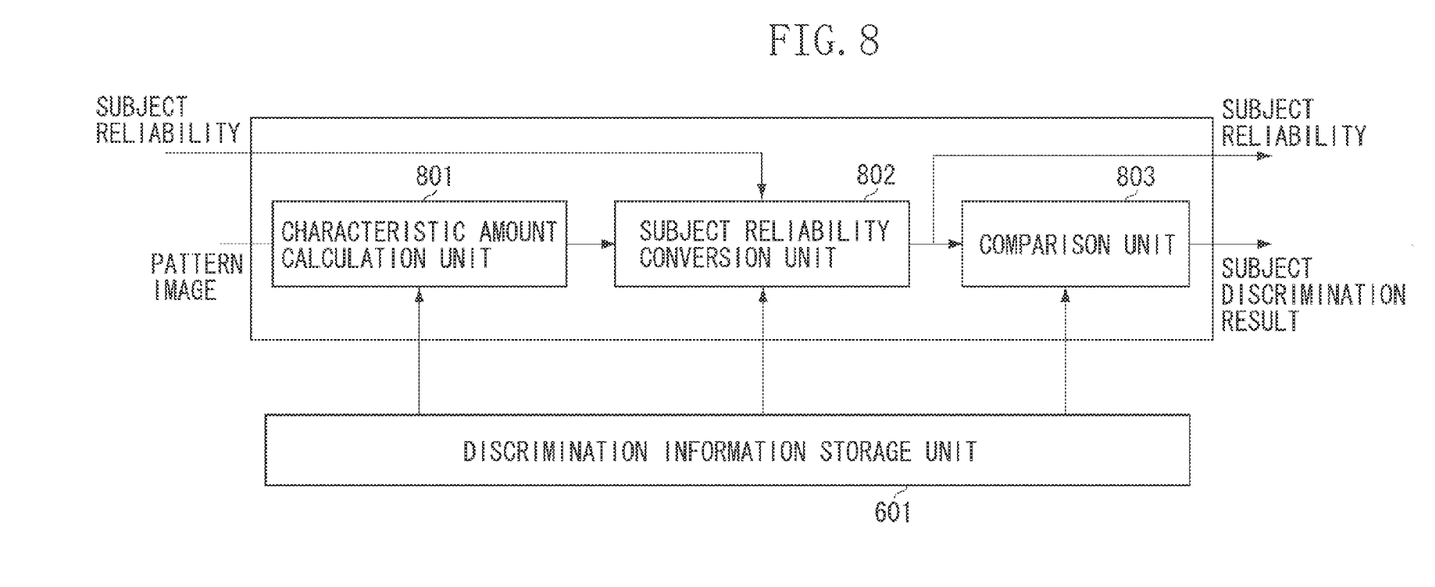
FIG. 8 illustrates an example of a weak discrimination unit.

Next, the weak discrimination unit 602 will be described below with reference to FIG. 8. FIG. 8 illustrates an example of the weak discrimination unit. The weak discrimination unit 602 includes a characteristic amount calculation unit 801, a subject reliability conversion unit 802, and a comparison unit 803.

The characteristic amount calculation unit 801 calculates a characteristic amount from a pattern image within a detection window. As a characteristic amount extraction method performed in the characteristic amount calculation unit 801, a technique is known for detecting a human body by a characteristic amount called Histogram of Oriented Gradients (HOG characteristic amount) (see US Publication Patent NO. 2007-0237387).

The above described HOG characteristic amount is to obtain a strength and a direction of a gradient in each pixel in advance, and to vote gradient strengths on direction-by-direction basis with respect to pixels in a predetermined local region, so that gradient strengths on the direction-by-direction basis in the local region is obtained. Further, in the US Publication Patent NO. 2007-0237387, in order to be robust against illumination, the gradient strengths are normalized by dividing the gradient strengths on the direction-by-direction basis by a sum of gradient strengths in all directions.

The characteristic amount calculation unit 801 divides the local region into equal halves in height and width to obtain four small regions with equal areas, and quantizes a number of directions into 9 directions, so that 36-dimensional feature vectors per one local region can be obtained. The characteristic amount calculation unit 801 determines the local region based on the local region information 704. A feature vector becomes a scalar value by an inner product with the projection coefficient 705. The projection coefficient 705 is a vector with a number of dimensions equal to that of the feature vector.

Further, the characteristic amount calculation unit 801 may set only one element out of vectors of the projection coefficient 705 to "1", set other elements to "0", and select only one-dimensional feature vector with good discrimination accuracy from among 36-dimensional feature vectors to obtain the scalar characteristic amount.

If a pattern image has a plurality of channels such as RGB or the like rather than luminance, the characteristic amount calculation unit 801 may select a channel in which a maximum gradient can be obtained for each pixel after variance at each channel is normalized, and regards the channel as the strength of the gradient. Parameters such as a division number of the local region and quantization number of directions are not limited to the present exemplary embodiment. There are many variations, such as generation of feature vectors by combining characteristic amounts in a plurality of different local regions.

Further, the characteristic amount calculation method is not limited to the above described method. For example, the characteristic amount calculation unit 801 can utilize Haar-like characteristic amounts. Further, in the above described Japanese Patent Application Laid-Open No. 2007-47965, luminance difference between two arbitrary points on a pattern subjected to multi-resolution conversion is utilized. The characteristic amount calculation unit 801 may use such a technique.

The subject reliability conversion unit 802 converts a scalar value output from the characteristic amount calculation unit 801 into subject reliability. A threshold value "t" and $\alpha$ and $\beta$ as subject reliability addition values are stored in the subject reliability conversion constant 706. The subject reliability conversion unit 802 outputs the subject reliability which the weak discrimination unit arranged at a previous stage has output by adding $\alpha$, if the value output by the characteristic amount calculation unit 801 is smaller than the threshold value "t", or by adding $\beta$ in the other cases. The output subject reliability is input into the comparison unit 803, and handed over to the weak discrimination unit at the subsequent stage.

As another processing method of the subject reliability conversion unit 802, a refined technique referred to as Real AdaBoost is known. The Real AdaBoost is to quantize scalar values output by the characteristic amount calculation unit 801 in a multistage manner such as 32 stages, and converts the quantized scalar values into subject reliability which correspond to respective stages using a look-up table. The subject reliability conversion unit 802 may convert characteristic amounts into subject reliability by such processing.

The comparison unit 803 compares large or small of the subject reliability output by the subject reliability conversion unit 802 and the threshold value. The comparison unit 803, if the subject reliability is lower than the non-subject threshold value 707, determines that it is not the subject, and terminates the discrimination processing. The comparison unit 803, in other cases, continues further discrimination processing by the weak discrimination units at the subsequent stage connected in series.

The discrimination unit may be configured such that the comparison with the threshold value is not performed in all of the weak discrimination units. A combination of several weak discrimination units may be defined as stage, and the discrimination unit may be configured by connecting the stages in series. Then, the discrimination unit may be configured in a manner that the subject reliability is compared with the threshold value only at the last weak discrimination unit of each stage. With such configuration, if it is determined as the subject as a result of comparison, the discrimination unit terminates the discrimination processing. Then, the discrimination unit resets accumulated data pieces of subject reliability to "0", and continues the discrimination processing with the weak discrimination unit of the next stage.

Figure 9:
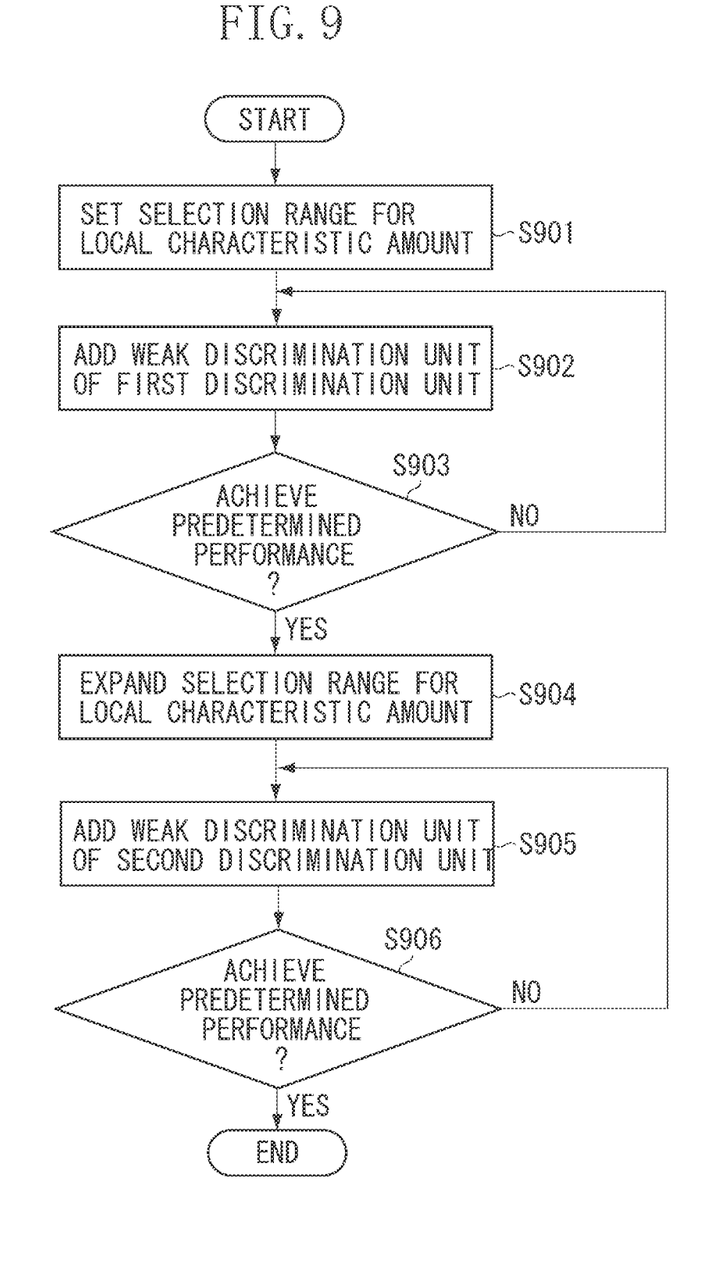
FIG. 9 is a flowchart illustrating an example of machine learning of the first discrimination unit and a second discrimination unit.

Next, a machine learning method performed in the first discrimination unit 104 and the second discrimination unit 105 will be described below. In the machine learning, first, a learning sample is prepared. For example, the CPU 201 acquires a learning sample which includes a subject sample image including a subject equal to a size of the detection window and a non-subject sample image not including the subject from the HDD 204 or the like. The discrimination of the subject detection is discrimination between two classes, that is, either a subject or a non-subject. Accordingly, an association with classes is performed such that the subject sample image is "subject", and the non-subject sample image is "non-subject".

The CPU 201 needs to normalize a position and a size of subject in the subject sample image. More specifically, the CPU 201 aligns the subject sample images so that heights come to the same position between the subject sample images, on the basis of two points of top of a head and a heel of a person. Further, the CPU 201 aligns the subject sample images so that a center of gravity of the entire body comes to the middle between the left and right. The CPU 201 uses an image clipped at random positions from an image not including the subject as the non-subject sample image. Further, the subject has to be an image in which there is no occlusion.

The images of the learning samples need to have the same channel configuration as a pattern to be input into the discrimination unit when the subject is detected. In the present exemplary embodiment, luminance images are used.

Next, a flow of learning will be described below with reference to FIG. 9. FIG. 9 is a flowchart illustrating an example of the machine learning performed by the first discrimination unit 104 and the second discrimination unit 105.

When processing of the machine learning is started, first, in step S901, the CPU 201 sets a selection range of the local region. In this process, the CPU 201 sets a region where a subject occlusion occurrence probability is low. Here, "subject occlusion occurrence probability" is a probability that a subject is hidden at a predetermined position or region of the detection window. A region where the subject is hidden is a portion of the subject which is located on an edge of an image, a hidden region overlapped with another subject, regions hidden behind a structure like a pillar or things like a desk, and the like. Clothes usually putting on, a hand baggage, and the like are not considered as hidden regions.

Next, how to obtain a subject occlusion occurrence probability will be described below. First, the CPU 201 collects images including a subject. At this time, it is desirable that camera parameters such as a location where a camera is installed, a time zone, zooming, an angle of view, and a lens, may be set to similar conditions to those when the subject is actually detected. Next, the CPU 201 converts the region including the subject into clipped image by normalizing the position and the size of the subject similarly to the subject sample image. The clipped images are equal to a size of the detection window. Next, the CPU 201 performs binarization of the pixel value of the image by setting "1" if the region where the subject is hidden and "0" in other cases.

Although the definition of the occlusion described above is only an example, it is necessary to unify the definition with selection criteria of the subject sample image of the learning sample. An image without occlusion is used by applying the same definition to the subject sample image.

The subject occlusion occurrence probability at a desired position within the detection window is a sum of pixel values which correspond to the desired positions of a plurality of the binarized images. The CPU 201 can determine the subject occlusion occurrence probability in the region by averaging the subject occlusion occurrence probabilities of each of pixels within the desired regions of the detection window.

In the present exemplary embodiment, the CPU 201 divides the detection window into upper and lower parts, and based on the subject occlusion occurrence probability in the upper half region and the subject occlusion occurrence probability in the lower half region, sets the upper body region where the subject occlusion occurrence probability is low. The CPU 201 may divide the detection window into further smaller regions.

Next, in step S902, the CPU 201 performs learning about the first discrimination unit 104. The CPU 201 performs learning of the first discrimination unit 104 using the machine learning by boosting.

More specifically, the CPU 201 assigns a weight to each sample, conducts sample-weighted discrimination error evaluation by applying parameters of the weak discrimination units on a round robin basis, and determines a parameter which has the best discrimination accuracy. Next, the CPU 201, when a weak discrimination unit is added, causes a weight of sample which results in error to be relatively larger, and acquires parameters which will have the best discrimination accuracy when combined, and adds the weak discrimination unit. There is a technique for selecting a local region where discrimination ratio is the highest from the Haar characteristic amounts in local regions of rectangles of various positions and sizes on the detection windows. However, in the present exemplary embodiment, characteristic amounts are determined by the characteristic amount calculation unit 801, instead of the Haar characteristic amounts. The projection coefficient 705 can be obtained by a linear support vector machine.

In the present exemplary embodiment, the CPU 201 does not select a local region from the whole detection window, but limits the local region to only a region set in step S901 to select the local region where the discrimination ratio is the highest.

In step S903, the CPU 201 determines whether preset desired discrimination accuracy is reached, each time a weak discriminator is added. If the desired discrimination accuracy is not reached (NO in step S903), then the process returns to step S902, and the CPU 201 repeats addition of the weak the discriminator in step S902 until the desired discrimination accuracy is reached. The CPU 201 may determine completion of the processing based on a number of the weak discriminators rather than the discrimination accuracy.

If the desired discrimination accuracy is reached (YES in step S903), then the process proceeds to step S904. The CPU 201 expands the selection range of the local region to a region where the subject occlusion occurrence probability is higher. In the present exemplary embodiment, the CPU 201 expands the selection range of the local region from the upper body region to the entire body region.

Next, the process proceeds to step S905, and the CPU 201 performs learning about the second discrimination unit 105, similarly to the processing in step S902. The second discrimination unit 105 selects the local region in which better discrimination performance is obtained from the entire body region including the region where the subject occlusion occurrence probability is high. This is a point that is different from the first discrimination unit 104.

In step S906, the CPU 201 determines whether the preset desired discrimination accuracy is reached each time a weak discriminator of the second discrimination unit 105 is added. If it is determined that the preset desired discrimination accuracy is not reached (NO in step S906), then the process returns to step S905, and the CPU 201 repeats addition of the weak discriminator until the desired discrimination accuracy is reached.

In the present exemplary embodiment, the CPU 201 expands the selection range of the local region in two stages, but may further increase a number of stages.

Further, in the present exemplary embodiment, the local region the whole of which is included in the region set in step S901 is selected, but it is not limited to this. For example, the selection criteria may be set to select the local region if an area thereof is included in the region set up in step S901 equal to or greater than a given percentage.

Regarding the machine learning by Boosting, refinement techniques, such as a Gentle AdaBoost which has refined a method for updating a weight of sample, a Real AdaBoost which has enhanced accuracy of conversion of quantity characteristic amount into subject reliability are proposed, and the present exemplary embodiment can be applied to any method.

Further, the machine learning may be performed by combining a support vector machine, a neural network, or the like, in addition to the Boosting. Furthermore, the machine learning may be performed in advance under general conditions to provide discrimination information obtained from the result, or may be performed, after a camera is installed, by using video images obtained from the installed camera. In the latter case, it is not necessary to perform the machine learning in the image processing apparatus according to the present exemplary embodiment. Images input from the image input device 205 are transmitted to a machine learning server via the network I/F 208 to perform the machine learning by the machine learning server, then the result may be stored in the discrimination information storage unit 601.

Figure 10:
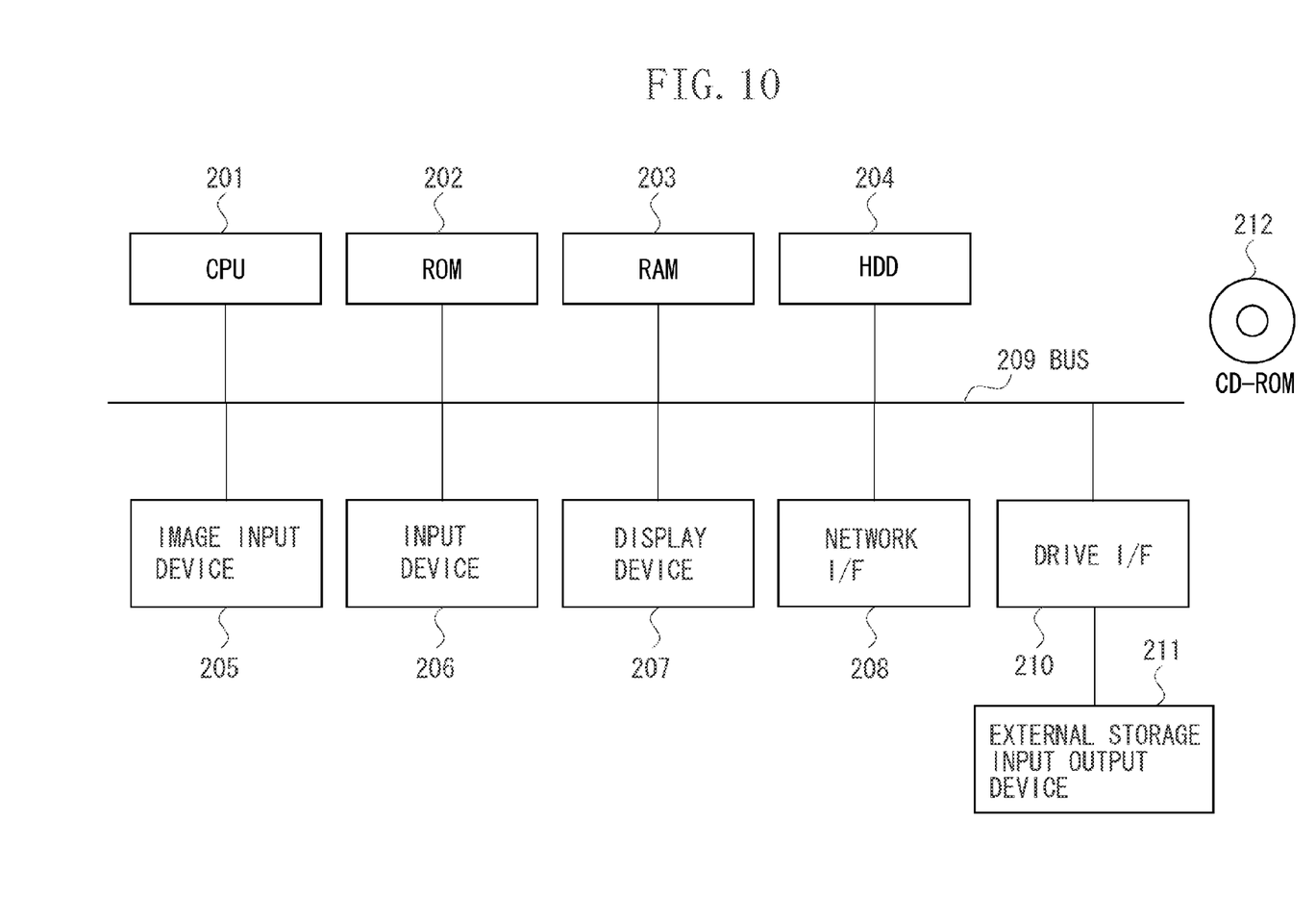
FIG. 10 illustrates an example of a hardware configuration of an image processing apparatus according to a second exemplary embodiment.

FIG. 10 illustrates an example of a hardware configuration of an image processing apparatus according to a second exemplary embodiment. The same numerical references are assigned to the parts that are common with those in the first exemplary embodiment. As a block configuration, an optical disk 212 such as a digital versatile disc (DVD) or a compact disc (CD) that records a program is added, and an external storage input/output apparatus 211 such as a CD/DVD drive is connected to the drive I/F 210 in the present exemplary embodiment. They are differences from the first exemplary embodiment. When the optical disk 212 that records the program is inserted into the external storage input/output apparatus 211, the CPU 201 reads the program from the storage medium, and rasterizes the program into the RAM 203. In this way, the processing similar to that of the first exemplary embodiment can be realized.

Although detection of a person region has been used in describing the first exemplary embodiment and the second exemplary embodiment, the above described configuration and processing of the respective exemplary embodiments can be applied to arbitrary objects other than a person, for example, a creature, a face, and an automobile. In the fields of industry and distribution, the configuration and processing of the above described exemplary embodiments can be applied to identification or inspection of a product, a part, or a product in distribution.

According to the above described exemplary embodiments, discrimination is performed from a region where occlusion probability of a subject is low, therefore the subject can be detected efficiently, and omissions of detection can be reduced.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-202856 filed Sep. 2, 2009, which is hereby incorporated by reference herein in its entirety.

What is claimed is:

1. An image processing apparatus comprising:
a processor comprising:
an image input unit configured to input an image;
a scanning unit configured to scan the input image with a moving detection window on the input image;
a first discrimination unit configured to determine whether a pattern within the detection window contains a predetermined subject based on a plurality of characteristic amounts obtained from a first region corresponding to a specific part of the predetermined subject within the detection window; and
a second discrimination unit configured to determine, if it is not determined that the pattern contains the predetermined subject by the first discrimination unit, whether the pattern within the detection window contains the predetermined subject based on a plurality of characteristic amounts obtained from a second region corresponding to the whole of the predetermined subject within the detection window,
wherein if the pattern is determined to be the predetermined subject by the first discrimination unit a determination by the second discrimination unit is omitted for the pattern within the detection window,
the first region is smaller than the second region and is placed at a predetermined position within the second region, and
a probability of occurring occlusion in the first region is lower than that in the second region other than first region.

2. The image processing apparatus according to claim 1, wherein the first discrimination unit calculates subject reliability concerning whether the pattern within the detection window contains the predetermined subject based on the plurality of characteristic amounts obtained from within the first region, and determines that the pattern contains the predetermined subject if the subject reliability is equal to or greater than a threshold value.

3. The image processing apparatus according to claim 1, wherein the first region is a region of an upper body of a person, and the second region is a region of an entire body of the person.

4. The image processing apparatus according to claim 1, further comprising an integration unit configured to integrate the detection windows of a plurality of positions with respect to the identical pattern which is determined to contain the predetermined subject by the second discrimination unit based on positions of the respective detection windows and the subject reliability calculated based on a plurality of characteristic amounts obtained from within regions within the respective detection windows.

5. The image processing apparatus according to claim 1, further comprising a correction unit configured to correct the subject reliability, if the subject reliability calculated by the first discrimination unit based on the plurality of characteristic amounts obtained from within the first region is equal to or greater than a threshold value.

6. A method for subject discrimination performed by an image processing apparatus, the method comprising:
inputting an input image;
scanning the input image with a moving detection window on the input image;
determining whether a pattern within the detection window contains a predetermined subject based on a plurality of characteristic amounts obtained from a first region corresponding to a specific part of the predetermined subject within the detection window; and
if it is not determined that the pattern contains the predetermined subject, determining whether the pattern within the detection window contains the predetermined subject based on a plurality of characteristic amounts obtained from within a second region corresponding to the whole of the predetermined subject within the detection window,
if it is determined that the pattern is the subject then do not determine whether the pattern within the detection window is the subject from within the second region the first region is smaller than the second region and is placed at a predetermined position within the second region, and a probability of occurring occlusion in the first region is lower than that in the second region other than first region.

7. A non-transitory computer-readable storage medium that stores a program for causing a computer to function as, an image input unit configured to input an image;

a scanning unit configured to scan the input image with a moving detection window on the input image;

a first discrimination unit configured to determine whether a pattern within the detection window contains a predetermined subject based on a plurality of characteristic amounts obtained from a first region corresponding to a specific part of the predetermined subject within the detection window; and a second discrimination unit configured to determine, if it is not determined that the pattern contains the predetermined subject by the first discrimination unit, whether the pattern within the detection window contains the predetermined subject based on a plurality of characteristic amounts obtained from a second region corresponding to the whole of the predetermined subject within the detection window, if it is determined that the pattern is the predetermined subject then do not determine whether the pattern within the detection window is the subject from within the second region, the first region is smaller than the second region and is placed at a predetermined position within the second region, and a probability of occurring occlusion in the first region is lower than that in the second region other than first region.

8. The image processing apparatus according to claim 1, wherein the first discrimination unit calculates a first subject reliability concerning whether the pattern within the detection window contains the predetermined subject based on the plurality of characteristic amounts obtained from the first region corresponding to the specific part of the predetermined subject within the detection window;

the second discrimination unit calculates a second subject reliability concerning whether the pattern within the detection window contains the predetermined subject based on the plurality of characteristic amounts obtained from the second region corresponding to the whole of the predetermined subject within the detection window; and the first subject reliability always exceeds a maximum value of the second subject reliability.

* * * * *